US012664581B2

(12) United States Patent
Alhaidari et al.

(10) Patent No.: US 12,664,581 B2
(45) Date of Patent: Jun. 23, 2026

(54) COMPUTER-IMPLEMENTED METHOD FOR PROTECTING SENSITIVE DATA IN A TRANSACTION BASED ON A SMART CONTRACT DEPLOYED IN A BLOCKCHAIN

(71) Applicant: Imam Abdulrahman Bin Faisal University, Dammam (SA)

(72) Inventors: Fahd Abdulsalam Alhaidari, Dammam (SA); Malak Saleh Aljabri, Dammam (SA); Lama Abdullah Alaqeel, Dammam (SA); Razan Mohammed Khormy, Dammam (SA); Salma Abdulrahman Bader, Dammam (SA); Shahad Mohammed Tayeb, Dammam (SA); Zahra Abdultawab Al Kubaish, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 47 days.

(21) Appl. No.: 18/332,083

(22) Filed: Jun. 9, 2023

(65) Prior Publication Data

US 2024/0412281 A1 Dec. 12, 2024

(51) Int. Cl.
*G06Q 30/08* (2012.01)
*H04L 9/00* (2022.01)
(Continued)

(52) U.S. Cl.
CPC ............. *G06Q 30/08* (2013.01); *H04L 9/302* (2013.01); *H04L 9/3066* (2013.01); *G06Q 2220/00* (2013.01)

(58) Field of Classification Search
CPC .... G06Q 30/08; G06Q 2220/00; H04L 9/302; H04L 9/3066
(Continued)

(56) References Cited

U.S. PATENT DOCUMENTS

2010/0183142 A1* 7/2010 Katagi .................... G06F 7/725
380/28
2017/0344988 A1* 11/2017 Cusden ................... G06F 21/00
(Continued)

FOREIGN PATENT DOCUMENTS

CN 110751544 A 2/2020
CN 110830452 A 2/2020

OTHER PUBLICATIONS

Li et al. ; A Blockchain-Based Sealed-Bid e-Auction Scheme with Smart Contract and Zero-Knowledge Proof ; Hindawi Security and Communication Networks, vol. 2021 ; May 19, 2021 ; 10 Pages.

*Primary Examiner* — Clifford B Madamba
(74) *Attorney, Agent, or Firm* — Oblon, McClelland, Maier & Neustadt, L.L.P.

(57) ABSTRACT

A computer-based bidding system, computer readable medium and method is provided for bidding on a project or service. A first client creates a project specification. Second clients bid on the project. A second client encrypts bid information immediately after creating a bid information file, calculates a first hash value for the bid information file, and submits the first hash value for linking as a block in a blockchain. A blockchain system performs a second encryption upon receiving the encrypted bid information, calculates a second hash value for the encrypted bid file, and submits the second hash value for linking as a block in the blockchain. The second client performs a third encryption when the bid information file is opened to generate an encrypted opened bid information file. The second client performs a bidding process with the first client using the bid information file.

18 Claims, 16 Drawing Sheets

(51) Int. Cl.
  H04L 9/30          (2006.01)
  H04L 9/32          (2006.01)
(58) Field of Classification Search
  USPC ........................................................... 705/37
  See application file for complete search history.

(56) References Cited

U.S. PATENT DOCUMENTS

2020/0082399 A1*   3/2020  Deshpande ........... H04L 9/3297
2020/0320518 A1*  10/2020  Simas ................... H04L 9/3247
2024/0346014 A1*  10/2024  Quigley ................. G06F 16/22

* cited by examiner

400

```
                        Smart Contract

Struct bid {
        bidID
        hashed value
        time
        status
}

Struct price {
        price
        projectID
        bidID
}
```

```
addBid(bidID, hashedValue, time, status)
getBid(bidID, status)
addPrice(price, projectID, bidID)
getPrice(projectID, bidID)
```

FIG. 4

COMPUTER-IMPLEMENTED METHOD FOR PROTECTING SENSITIVE DATA IN A TRANSACTION BASED ON A SMART CONTRACT DEPLOYED IN A BLOCKCHAIN

STATEMENT REGARDING PRIOR DISCLOSURE BY THE INVENTORS

Aspects of this technology were disclosed at "She Codes 2022," held at Princess Nourah bint Abdulrahman University on Oct. 12-13, 2022, and are herein incorporated by reference in its entirety.

BACKGROUND

Technical Field

The present disclosure is directed to a bidding system that is implemented using blockchain technology.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Bidding is one process that is used to select a vendor for subcontracting a project, or for purchasing products and services that are required for a project. The project may be formally described in a project specification. A project specification describes the specifications of the project or details of the products and services to be purchased. A bid document describes the specifications and estimated costs of the project. The bid document also contains a list of potential vendors.

Many agencies seeking a Request for Proposal (RFP) or a Request for Quote (RFQ) utilize online portals to submit bid documents. Online submission of bid documents leaves the bidding process vulnerable to information leakage and data manipulation.

Information leakage is a serious problem faced by online bidding systems, as it leads to the unfair selection of the winning bidder. In the case of data manipulation, a bid document may be inappropriately viewed and/or modified by third parties at any point between where it is first submitted to the point where it is opened.

It is one object of the present disclosure to describe a system and method that ensures that the bid is not leaked to and/or modified by third parties. It is a further object of the present disclosure to achieve data integrity and privacy.

SUMMARY

An aspect of the present disclosure is a computer-based bidding system for bidding on a project, can include a first computer configured to create a project specification that includes a list of potential bidders; a plurality of second computers for the potential bidders to bid on the project; a blockchain computer system for maintaining a blockchain; at least one of the plurality of second computers configured to execute a first encryption encrypting bid information immediately after creating a bid information file, calculate a first hash value H1 for the bid information file, and submit the first hash value H1 for linking as a block B1 in the blockchain; the blockchain computer system configured to perform a second encryption upon receiving the encrypted bid information, calculate a second hash value H2 for a first encrypted bid file C1, and submit the second hash value H2 for linking as a block B2 in the blockchain; the at least one second computer configured to perform a third encryption when the bid information file is opened to generate an encrypted opened bid information file; and the at least one second computer performing a bidding process with the first computer using the bid information file.

A further aspect of the present disclosure is a non-transitory computer-readable storage medium storing program instructions for computer-based bidding system for bidding on a project, the program instructions which when executed by a computer system, perform a method that can include creating, by a first computer, a project specification that includes a list of potential bidders; executing, by at least one of a plurality of second computers, a first encryption encrypting bid information immediately after creating a bid information file, calculating a first hash value H1 for the bid information file, and submitting the first hash value H1 for linking as a block B1 in a blockchain maintained in a blockchain computer system; performing a second encryption in the blockchain computer system upon receiving the encrypted bid information, calculating a second hash value H2 for a second encrypted bid file C2, and submitting the second hash value H2 for linking as a block B2 in the blockchain; performing a decryption in the second computer when the bid information file is opened to generate a decrypted opened bid information file; and performing a bidding process using the bid information file.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4 is a class diagram for a smart contract for a blockchain-based bidding system in accordance with exemplary aspects of the disclosure;

DETAILED DESCRIPTION

Figure 1:
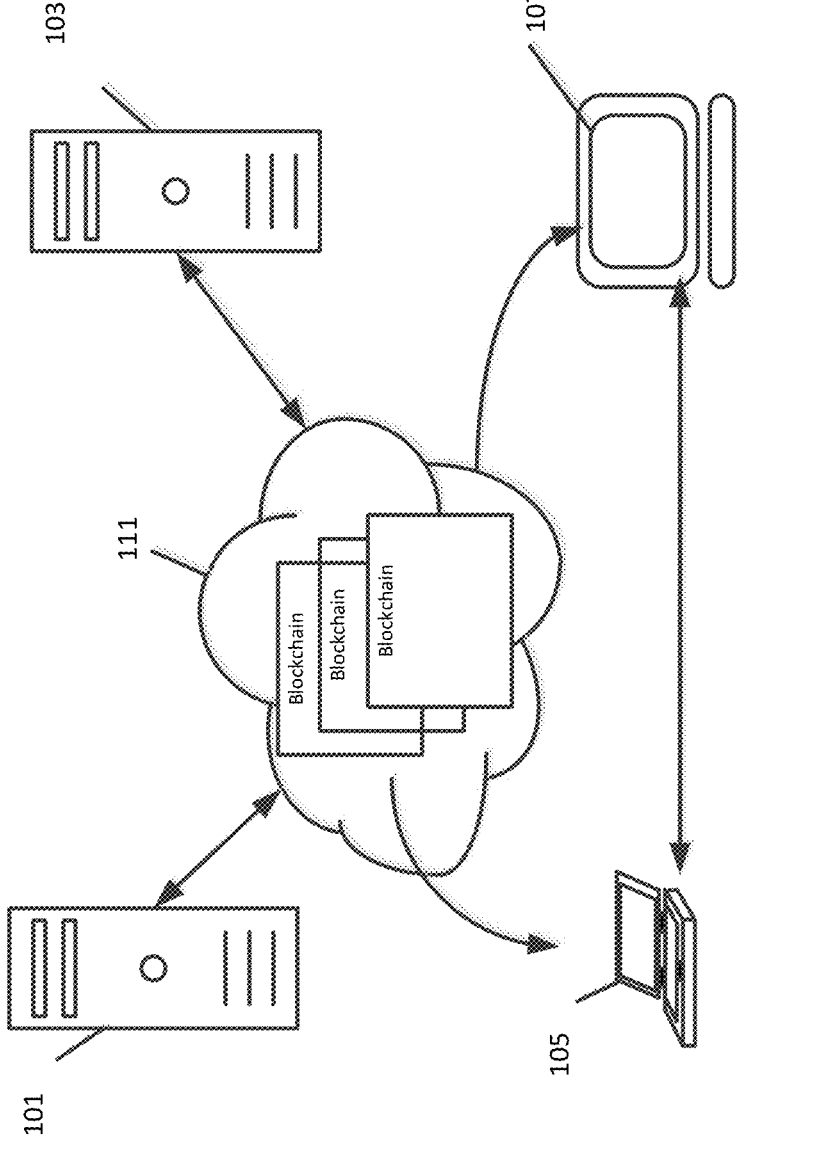
FIG. 1 is a diagram of an exemplary blockchain-based bidding system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

The disclosure herein describes a blockchain platform configured for project bidding. This platform aims to provide a highly secured process that ensures the security of the bidding files provided by the bidders. Different techniques and security-based methods are used to solve all the matters that might affect the trust and confidentiality of this bidding process. In particular, the blockchain is implemented in a manner that guarantees the data integrity and privacy of each step through three layers of hashed values that securely protect the most important and sensitive parts of the bidding process.

FIG. 1 is a system diagram illustrating an example of a configuration of a blockchain-based bidding system. A bidding process can be conducted between a bidder and an auctioneer. Both the bidder and the auctioneer may be implemented in client computers 105, 107. In disclosed embodiments, a blockchain system is used to secure the bidding process. An exemplary blockchain system typically includes at least two blockchain workstations 101, 103. The blockchain may be stored as copies of the distributed ledger in distributed computer network, referred to as nodes connected in the blockchain network. In some embodiments, the blockchain can be maintained in a service, such as a cloud service 111. In either case, the computer system that maintains the blockchain is referred to as a blockchain computer system. The client computers 105, 107 are clients that use the blockchain system.

A blockchain is a shared, immutable ledger that facilitates the process of recording transactions and tracking assets in a computer network, which in the present disclosure are bid information files. In the present disclosure, all bidding clients have access to the distributed ledger and its immutable record of transactions. With this shared ledger, transactions are recorded for actions performed on the bid information files. No participant can change or tamper with a transaction after it's been recorded to the shared ledger. If a transaction record includes an error, a new transaction must be added to reverse the error, and both transactions are then visible.

Blockchain workstations 101, 103 verify transactions with a consensus algorithm. Two widely used consensus algorithms include proof of work and proof of stake. The proof of work consensus algorithm uses complex problems for miners to solve using a high-powered blockchain workstation. In proof of stake consensus, miners pledge an investment in digital assets before validating transactions. To validate new blocks, miners put up stake with assets of their own. Miners may also show how long they have been validating transactions. Different from proof of work, the choice for which miner validates each transaction is random using a weighted algorithm, which is weighted based on the amount of stake and the validation experience. Other consensus mechanisms can be used. Other consensus mechanisms, include, but are not limited to, Delegated Proof of Stake, Proof of Activity, Proof of Authority, Proof of Burn, Proof of Capacity, Proof of History, and Proof of Importance.

As each transaction occurs, it is recorded as a "block" of data. Once a transaction is verified, the transaction is added as a new block to a blockchain. Each block is connected to the ones before and after it. Furthermore, the transactions are blocked and related together in an irreversible chain: the blockchain.

The blocks confirm the exact time and sequence of transactions, and the blocks link securely together to prevent any block from being altered or a block being inserted between two existing blocks.

Each block in a blockchain is a structure that includes a header and a body. The header contains a hash of the previous block, a time stamp when the block is created, a nounce, and a Markle root. The body contains one or more transaction hashes and a time stamp associated with the respective hashes.

To perform transactions, a set of rules, called a smart contract, is stored on the blockchain and executed automatically. A smart contract can define conditions for processing of a bid information file.

Figure 2:
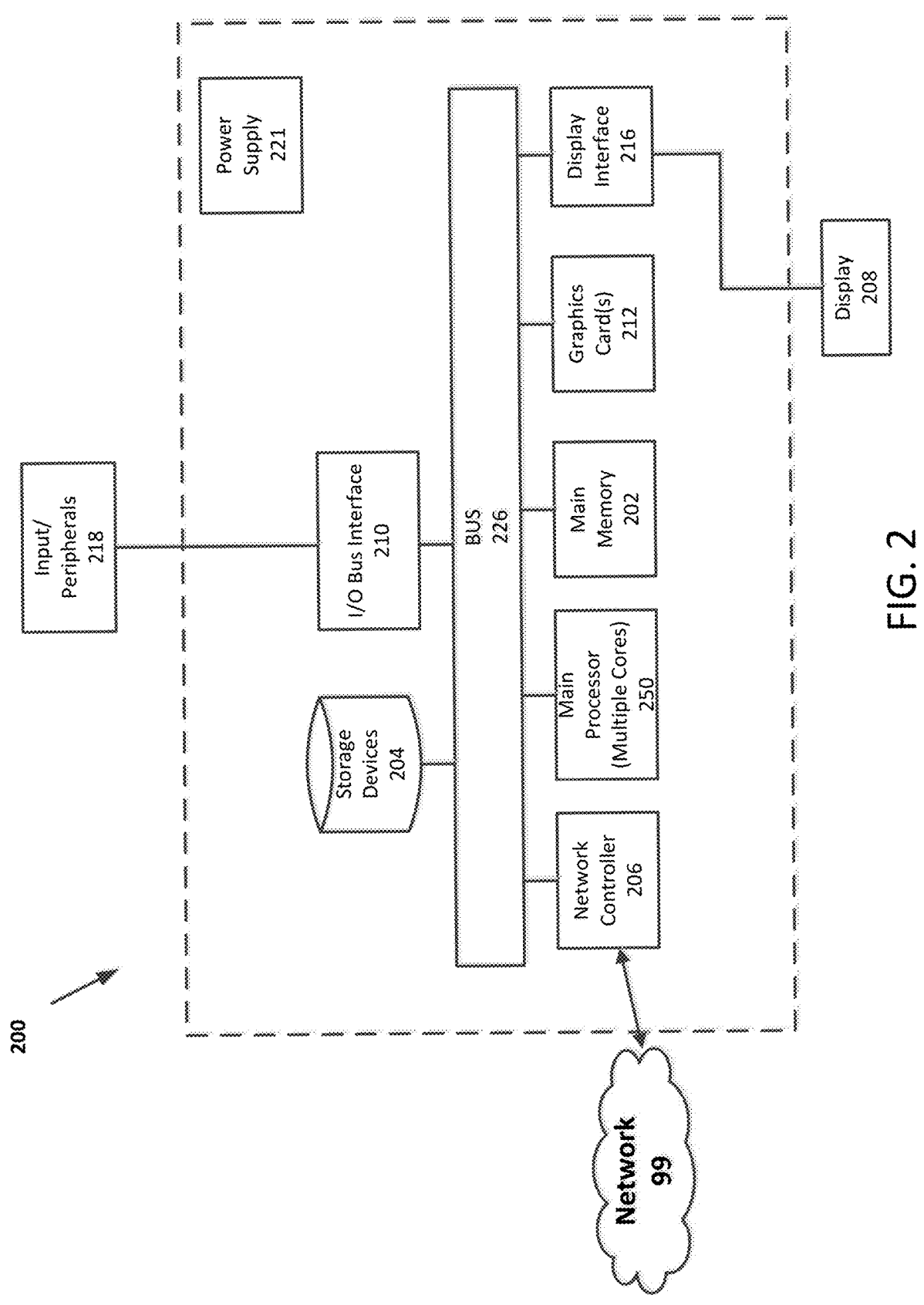
FIG. 2 is a block diagram of a computer system for blockchain processing.

FIG. 2 is a block diagram illustrating an example computer system for implementing the blockchain consensus algorithm according to an exemplary aspect of the disclosure. The computer system may be a workstation 101, 103 running an operating system, for example Ubuntu Linux OS, Windows, a version of Unix OS, or Mac OS. The computer system 200 may include one or more central processing units (CPU) 250 having multiple cores. The computer system 200 may include a graphics board 212 having multiple GPUs, each GPU having GPU memory. The graphics board 212 may perform many of the mathematical operations of the disclosed machine learning methods. The computer system 200 includes main memory 202, typically random access memory RAM, which contains the software being executed by the processing cores 250 and GPUs 212, as well as a non-volatile storage device 204 for storing data and the software programs. Several interfaces for interacting with the computer system 200 may be provided, including an I/O Bus Interface 210, Input/Peripherals 218 such as a keyboard, touch pad, mouse, Display Adapter 216 and one or more Displays 208, and a Network Controller 206 to enable wired or wireless communication through a network 99. The interfaces, memory and processors may communicate over the system bus 226. The computer system 200 includes a power supply 221, which may be a redundant power supply.

In some embodiments, the computer system 200 may include a server CPU and a graphics card by NVIDIA, in which the GPUs have multiple CUDA cores. In some embodiments, the computer system 200 may include a machine learning engine 212.

Figure 3:
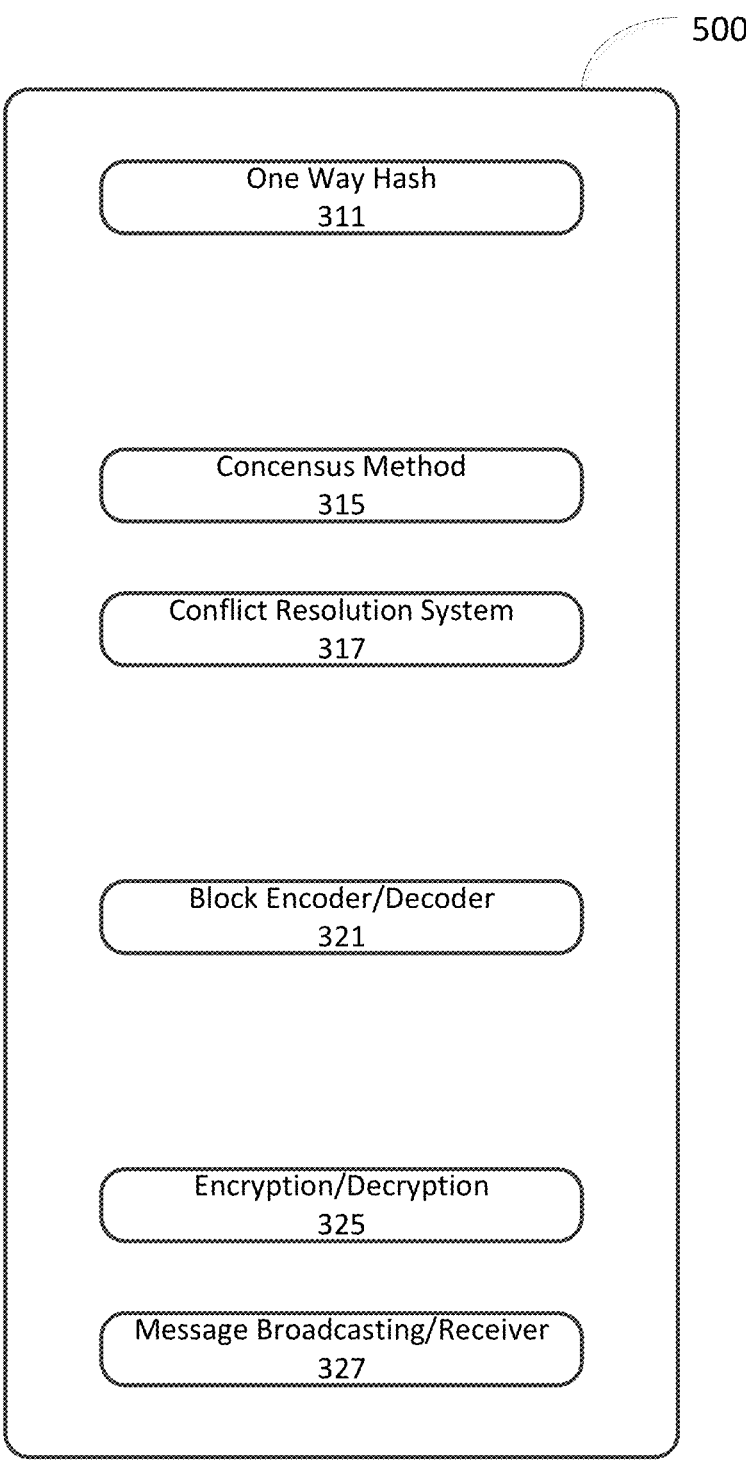
FIG. 3 is a block diagram of system modules for a blockchain-based bidding system in accordance with exemplary aspects of the disclosure.

FIG. 3 is a block diagram of system modules for a blockchain-based bidding system. The blockchain-based bidding system can in the form of a software program stored on a computer readable storage medium 300. The computer readable storage medium can be any storage medium that is capable of storing computer program code, including, but not limited to, a magnetic hard disk, solid state memory device, optical storage device, as well as a read only memory device. The computer program code can be organized as software modules, including hash function module 311, one or more consensus module 315, a conflict resolution system 317, an encoder/decoder module 321, an encryption/decryption module 325, and a message broadcasting/receiver module 527.

The hash function module 311 includes one or more one way hash functions, such as MD5 and SHA-1. A one-way hash function, also known as a message digest, is a mathematical function that takes a variable-length input string and converts it into a fixed-length binary sequence that is computationally difficult to invert, that is, generate the original string from the hash.

The consensus module 315 contains the functions necessary to perform a consensus method/algorithm to verify the addition of a block to the blockchain. As mentioned above, two widely used consensus algorithms include proof of work and proof of stake. Other consensus mechanisms may be used for verifying the addition of blocks to the blockchain. In the case of the proof of work consensus algorithm, the consensus module 315 provides the complex problems for miners to solve. In the case of proof of stake consensus algorithm, the consensus module 315 receives and stores each miner's pledge in digital assets. The consensus module 315 may also receive information from miners that indicates how long they have been validating transactions. The consensus module 315 can perform a weighted algorithm to choose which miner is to verify a transaction, where the weighted algorithm is weighted based on the amount of stake and the validation experience.

A conflict resolution system module 317 can include a function to resolve conflicts such as an invalid block, and attempt to insert an invalid block, and an unknown miner.

A block encoder/decoder module 321 can encode or decode blocks, files and/or documents for sending.

An encryption/decryption module 325 can perform one or more encryption algorithms. The encryption algorithms preferably include an asymmetric encryption method. In such case, each new project and bid will have a private and a public key. Asymmetric cryptography uses two different keys for encryption and decryption. The public key is used to encrypt a message, while the private key is used for decryption. The encryption/decryption module 325 is configured for an asymmetric encryption method, including, but not limited to, an integer-based asymmetric encryption such as RSA, and elliptic curve encryption.

In the case of RSA, encryption is performed such that plaintext is raised to the power of the public key. The public key is the product of two large distinct primes. This value is then divided by a public modulus and the remainder is sent as the ciphertext. Decryption is performed, but using the private key instead of the public key to produce the plaintext.

In the case of elliptic curve cryptography, instead of using integers for its calculations, elliptic curve cryptography uses points on an elliptic curve. A private key is still a random number, but a public key is a point on the elliptic curve.

A message broadcasting/receiver module 327 performs sending of and receiving of messages between the blockchain computer system and the miner workstations.

FIG. 4 is a diagram for a smart contract for a blockchain-based bidding system. A smart contract is a software object that contains a set of rules for performing transactions. The smart contract is typically stored on the blockchain and executed automatically. In one or more embodiments, a smart contract defines conditions for bid processing.

The smart contract 400 in FIG. 4 illustrates some specific data items and functions, but is not limited to those shown. The smart contract 400 is a block in the form of a data structure that holds data items and function definitions, i.e., rules that govern the management of the Blockchain. The smart contract may store data items including a project name, a bidder address, time, and output. The smart contract

400 in FIG. 4 includes bid and a price attributes and several exemplary functions. A constructor function may be called when the contract creates and sets a bid document to be the address deploying the contract. Smart contract functions can include addBid, getBid, addPrice, and getPrice FIGS. 5A-5G are a flowchart for a blockchain-based bidding system. FIGS. 6 to 10 illustrate user interface screens that may be displayed to bidders and auctioneers. In disclosed embodiments, a bidding process is conducted between a bid contract manager (auctioneer) and a group of several vendors r (bidders). Bid records contain the specifications of the project or details of the products and services to be purchased. The auctioneer creates a bid document that describes the specifications of the project. The bid document describes the specifications and estimated costs of the project. The bid document may also contain a list of potential bidders. The auctioneer will award the bid to the bidder that best meets the requirements of the services. A contract is then created using the bid details.

In disclosed embodiments, blockchain technology is used to record all bids in order to guarantee that the data will not be modified. To achieve the privacy of information, three layers of protection are applied including encrypting the bid information (bid information file) immediately upon sending it, then making a second encryption upon receiving the bid information file, and then making a third encryption when the bid information file is opened. As such, the blockchain-based bidding system ensures that the information is not leaked or modified by a third party. In addition, each authentic document is stamped by performing a comparison to authorize the authenticity of the bid information file then applying a digital signature to show that this bid information file was tested and is valid to be used in the bidding. After generating the digital signature and validating the bidding process, C2 and C1 are decrypted to get the bid file, then the bid file is sent to the Blockchain to create a fourth block. A reason for saving the bid files in a fourth block instead of the database is to prevent any chance of price modification.

Figure 5A:
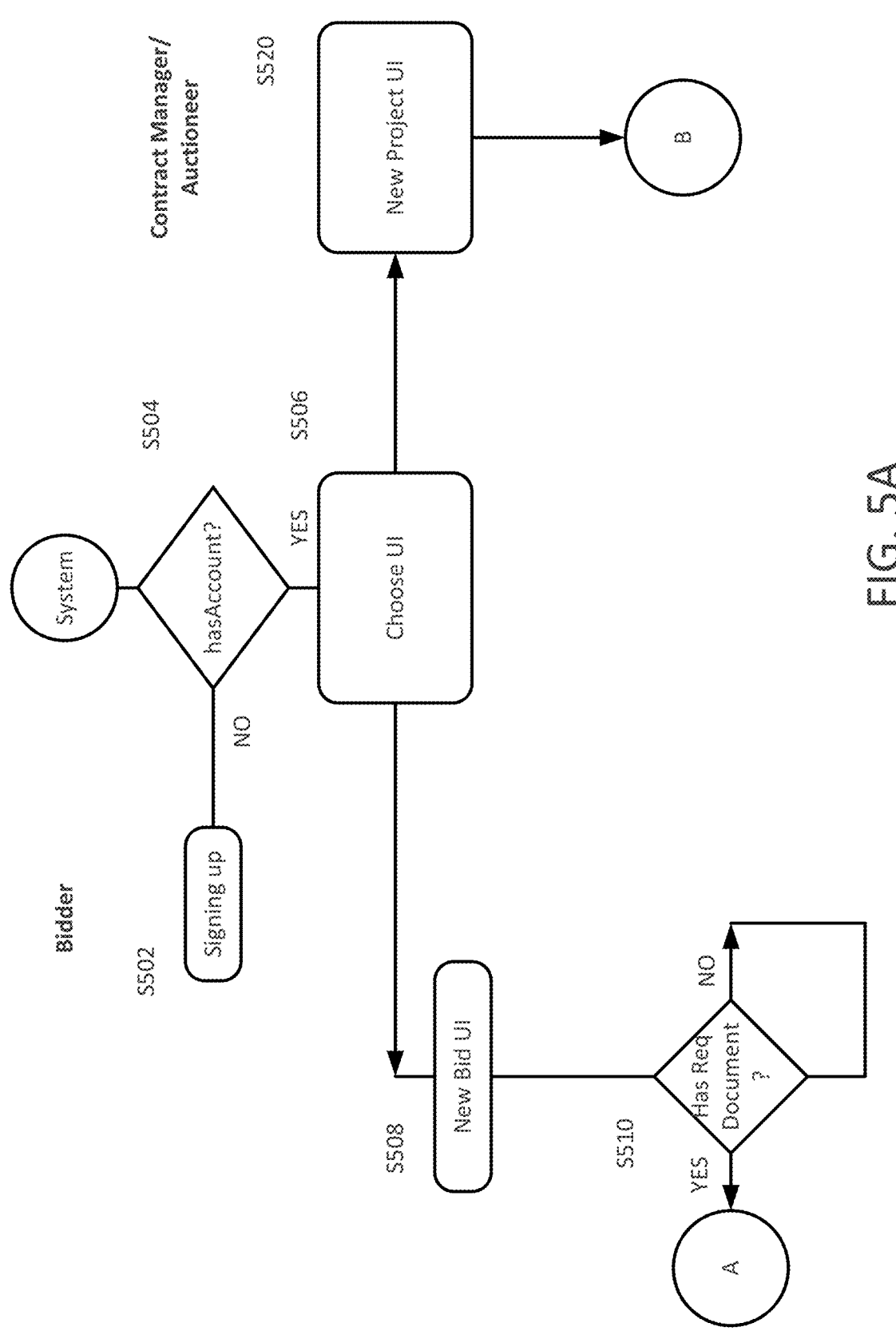
FIGS. 5A-5G are a flowchart for a blockchain-based bidding system in accordance with exemplary aspects of the disclosure.

Regarding FIG. 5A, the blockchain-based bidding system allows bids from bidders that have an account. In other words, bidders that wish to submit bids are required to set up an account in the system. To set up an account, in S502 a bidder/vendor (client computer 105) creates a username and password and provides certain contact information, including company name, address, phone numbers, and other information about the bidder, such as the sector of the company and their business activities. As such, depending on the chosen sector, the projects to bid on will be displayed in a screen for the bidder. The contract manager (client computer 107) will also have an account that requires a username/password to enter the system. Once a bidder 105 has an account (YES in S504), in S506, the bidder 105 will be presented with a system home screen that depends on whether the user is a bidder or is a contract manager. In S520, a contract manager 107 is presented with a user interface to create a new project. A project includes, among other things, a start date and an end date. In S522, the contract manager 107 creates a project and start date and end date.

In S508, the bidder 105 is presented with a user interface for displaying a new bid form.

In S510, the system receives a new bid information and checks that the bid information is complete. The system continues to accept the bid information until the bid information is completed (YES in S510).

Each new project and bid is provided with a private and a public key. The overall system provides three layers of protection. The first layer is provided on the client-side (bidder client computer 105) by encrypting the bid file and hashing value calculated for the bid file. Then, the hashed bid file is saved in the blockchain (maintained in the blockchain computer system). The second layer is provided on the system side (blockchain computer system), where the encrypted bid file "C1" is received. The encrypted bid file is encrypted again using the project public key. The second encryption "C2" is saved into the system database. Moreover, the second encryption is hashed and added to the blockchain as a new block. The last layer is applied when the deadline for bidding expires. Bidders (Bidder client computer 105) can decrypt their bid files using their private keys.

The blockchain computer system will verify the resulting file hash with the hash saved into the first block, which is added in the first layer. The resulting third block is added to save the date of opening the bid file.

These three layers increase the trust and confidence between the bidders (vendors) and contract managers/auctioneers that each step was recorded in a blockchain and then verified that there is no manipulation to the process has happened.

And if the hash verification process is successful, the bid information file will be given a digital signature to show that this document was tested and is valid to be used in the bidding.

Figure 5B:
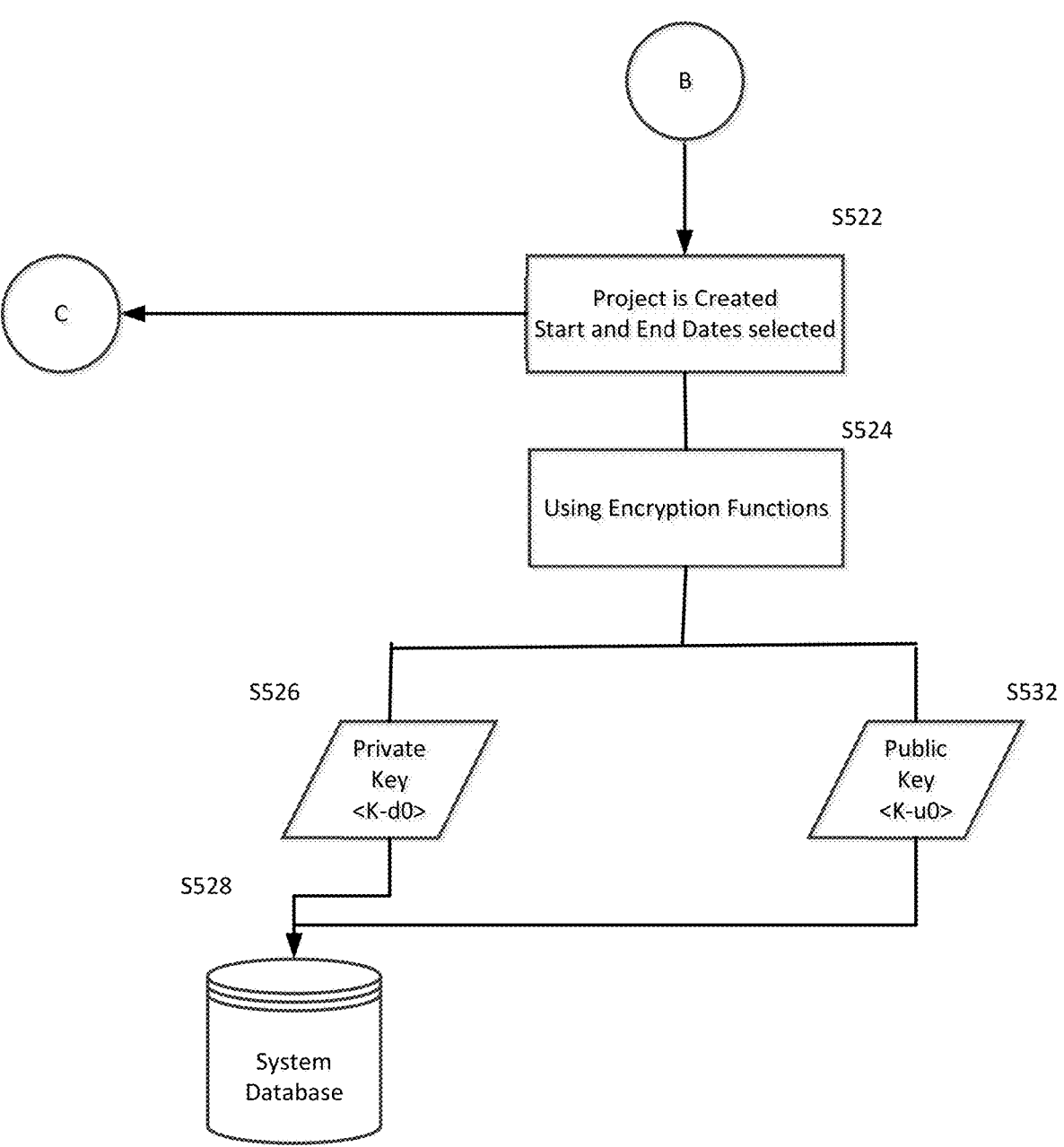
Figure 5C:
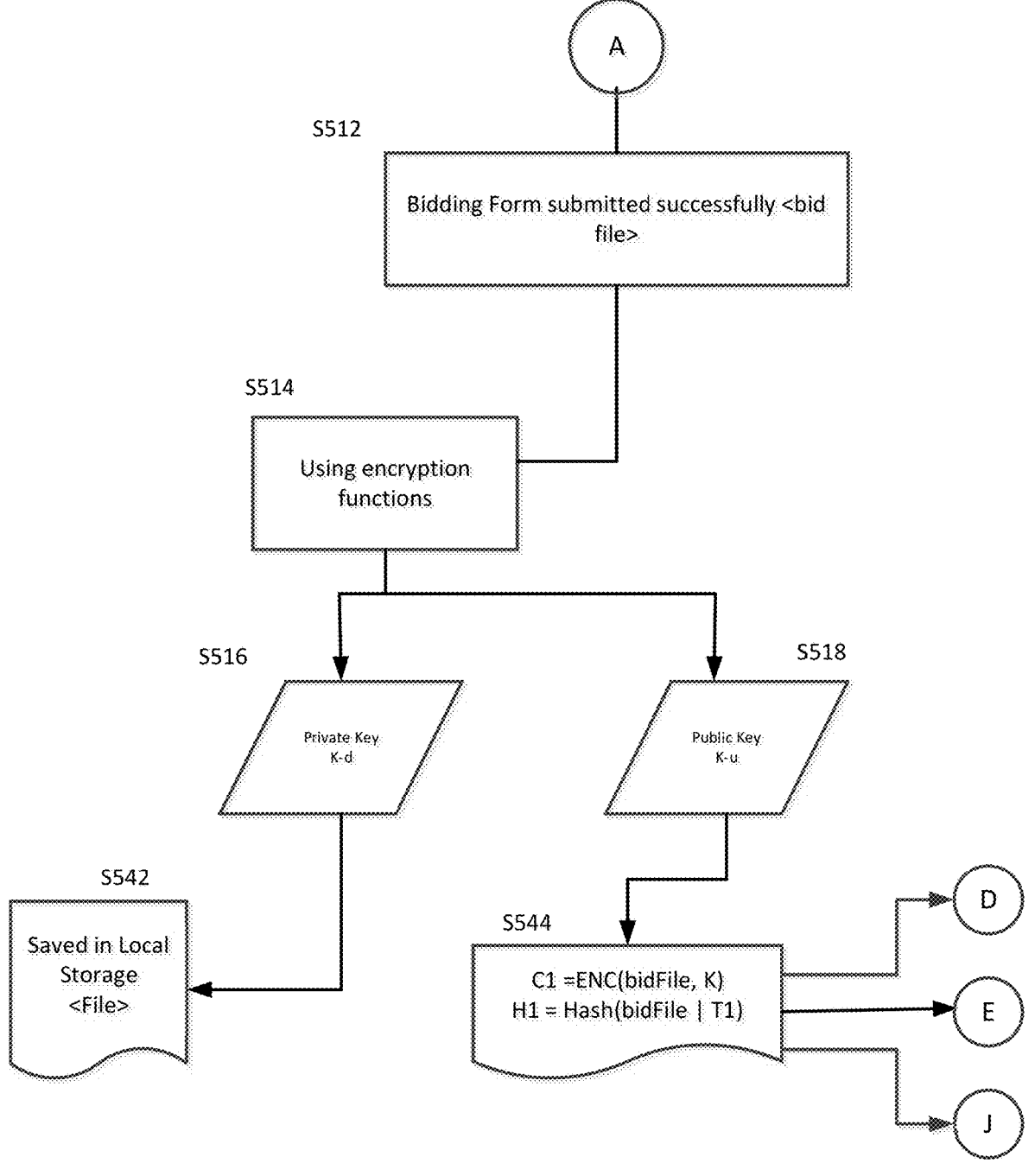
Figure 6:
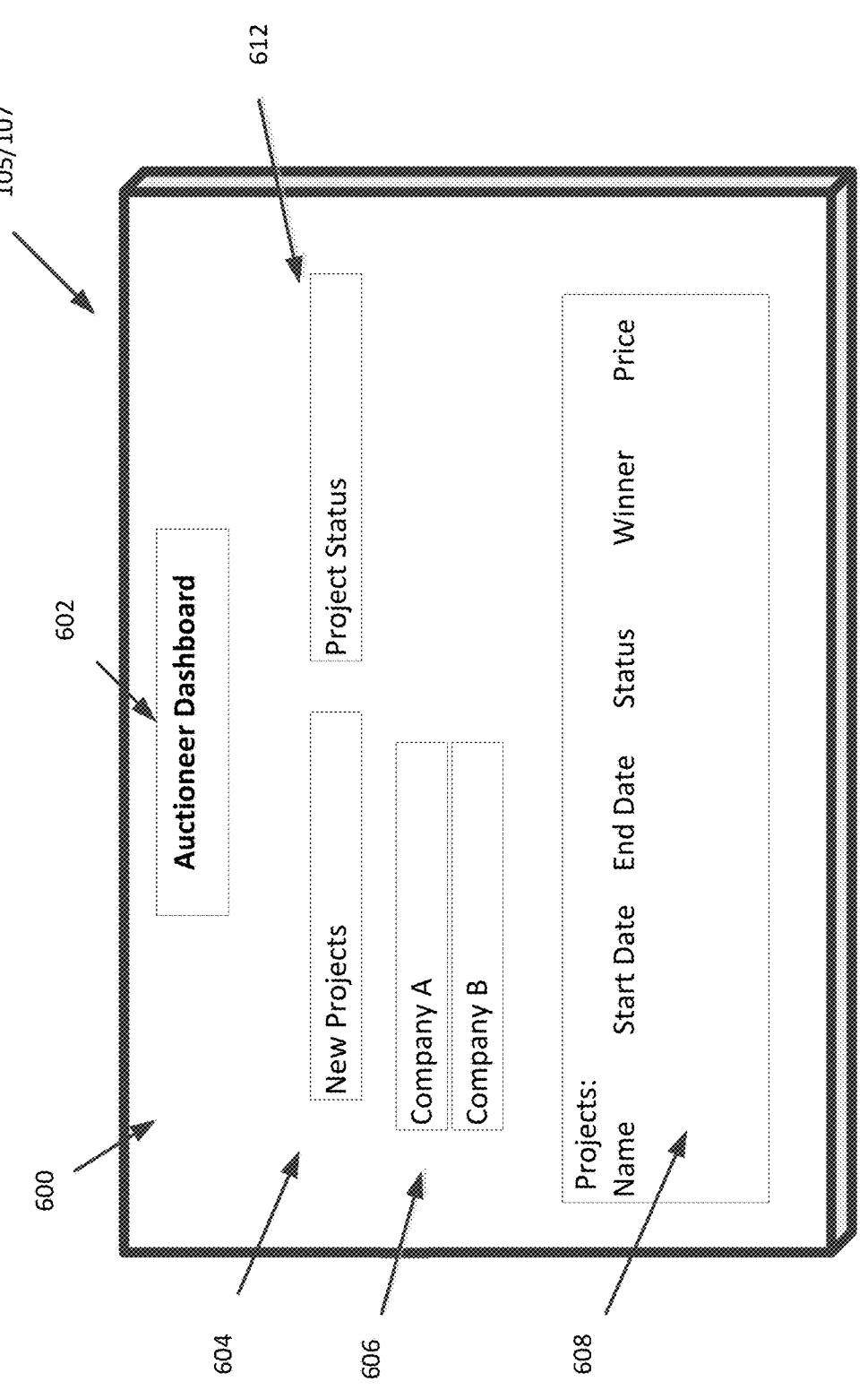
FIG. 6 illustrates a display screen for an auctioneer dashboard in accordance with exemplary aspects of the disclosure.

Regarding FIG. 5B, in S520, a bidding process starts from the auctioneer side by publishing projects on the bidding platform. FIG. 6 illustrates a display screen 600 having an auctioneer dashboard 602. The Auctioneer Dashboard provides information about projects and bidders on projects, to give an overview of projects that have been created by the auctioneer. The Auctioneer Dashboard can include a function 604 of selecting a project, a function 612 for displaying a project status of a selected project. The Dashboard will display a list of companies 606 that have bids on a selected project. The Auctioneer Dashboard can also display information 608 of all projects.

Figure 7:
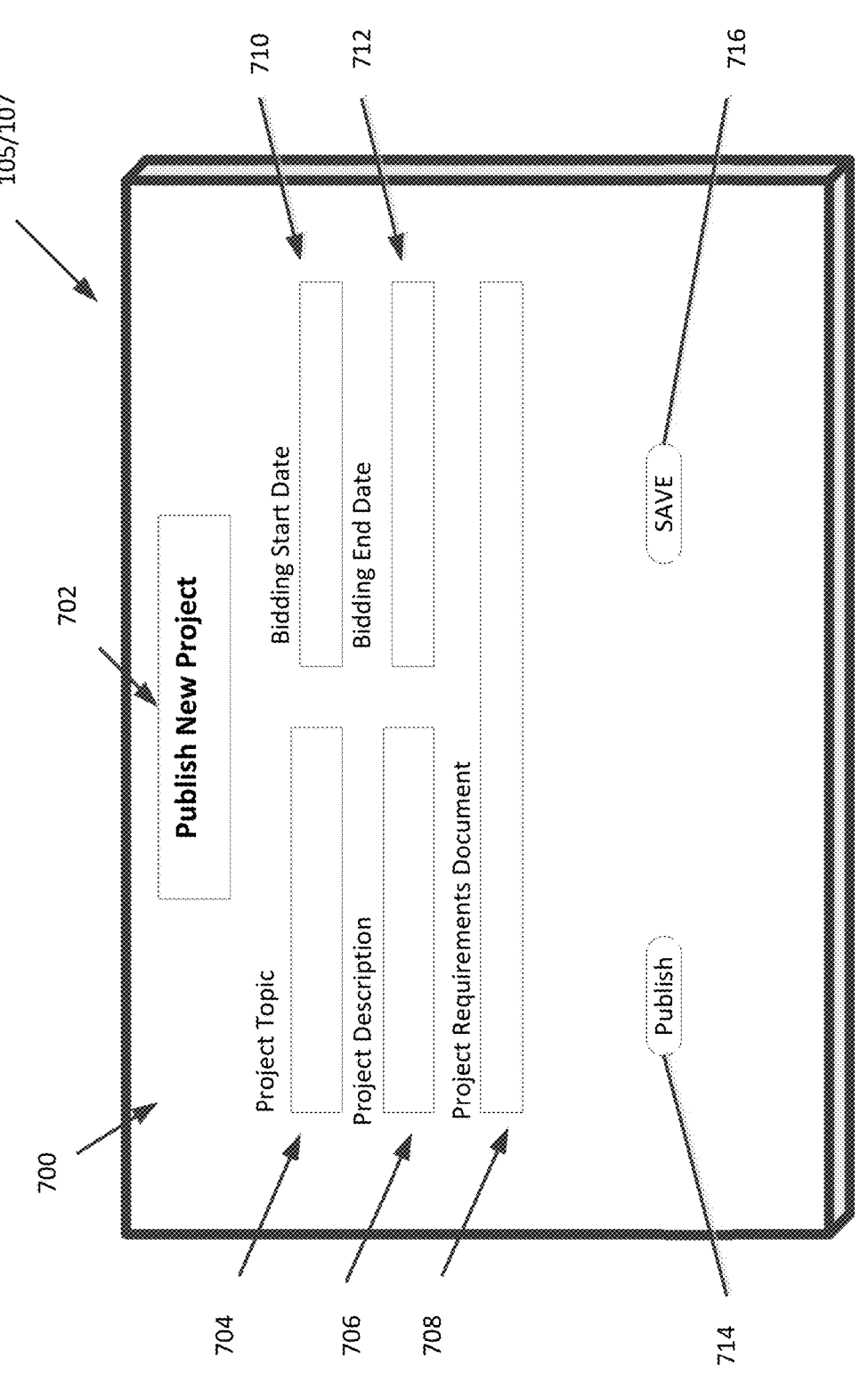
FIG. 7 illustrates a display screen for publishing a new project in accordance with exemplary aspects of the disclosure.

FIG. 7 illustrates a display screen 700 having a form 702 for publishing a new project (S520). In S522, a project is created by entering a project topic 704, a project description 706, and the start 710 and end 712 dates. The form 702 can include a slot for entering a Project Requirements Document 708. A new project may be saved, via a button 716, for later revision and/or publication. A new project may be published via button 714.

In S524, the system invokes an encryption function. In one embodiment, the encryption function is an Open SSL function.

In S526, the encryption function generates a private key. In one embodiment, the private key is a random string. The encryption function may be any string-based asymmetric encryption such as RSA, and elliptic curve encryption.

In S532, the system invokes the encryption function to generate a public key. In the case of the RSA algorithm, the public key is a product of two large distinct prime numbers. In S528, the private key, the public key, and project information are stored in a system database.

Figure 8:
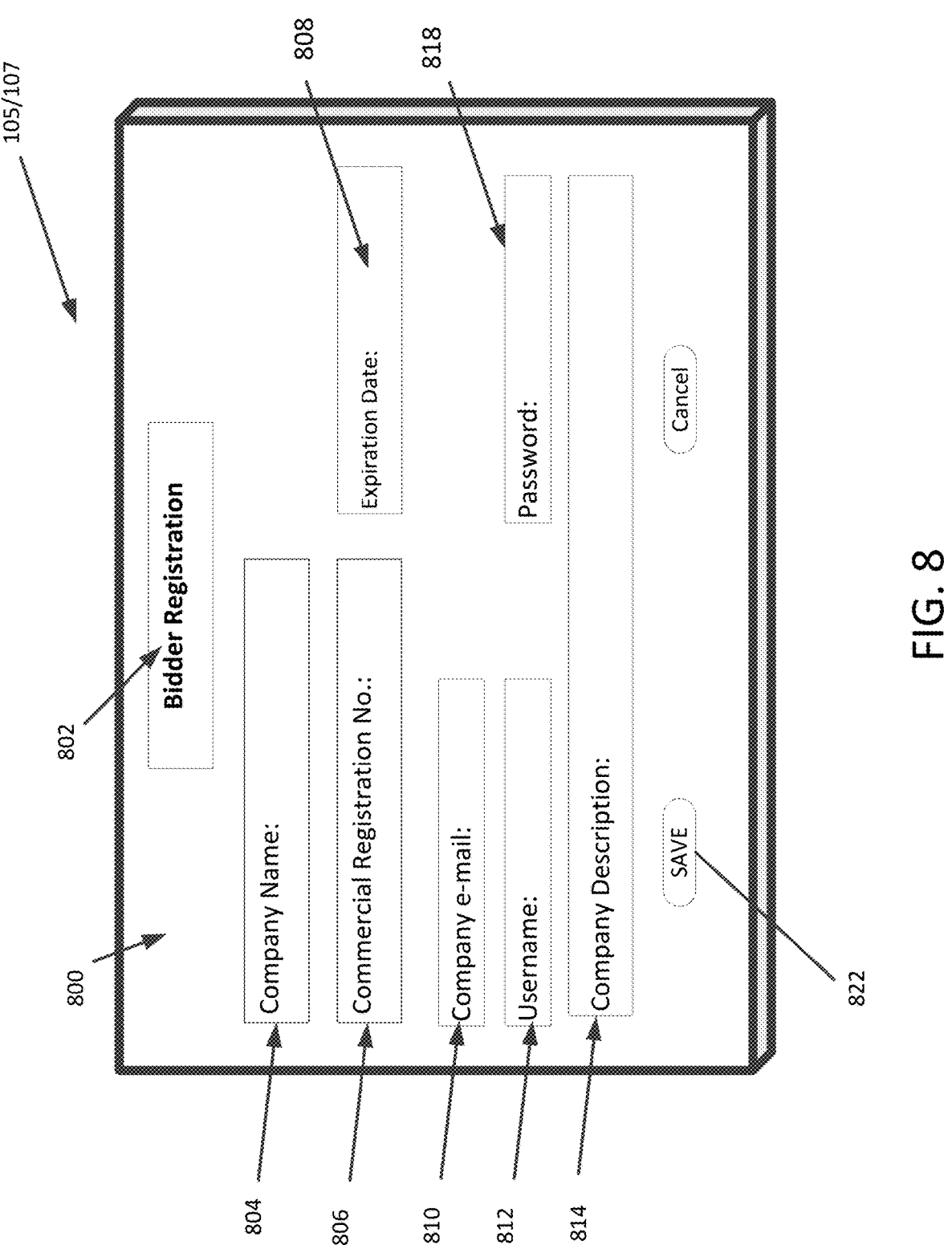
FIG. 8 illustrates a display screen for bidder registration in accordance with exemplary aspects of the disclosure.

FIG. 8 illustrates a user interface screen for a bidder to register as a new bidder. The bidder registration screen 800 displays a bidder registration form 802, which includes an input for a company name 804, a commercial registration number 806, an expiration date 808 of the registration number. The form includes a slot for entering a company email 810, as well as for setting a username 812 and password 818. Company description may be entered in a slot 814. The bidder information may be saved via a button 822.

Figure 9:
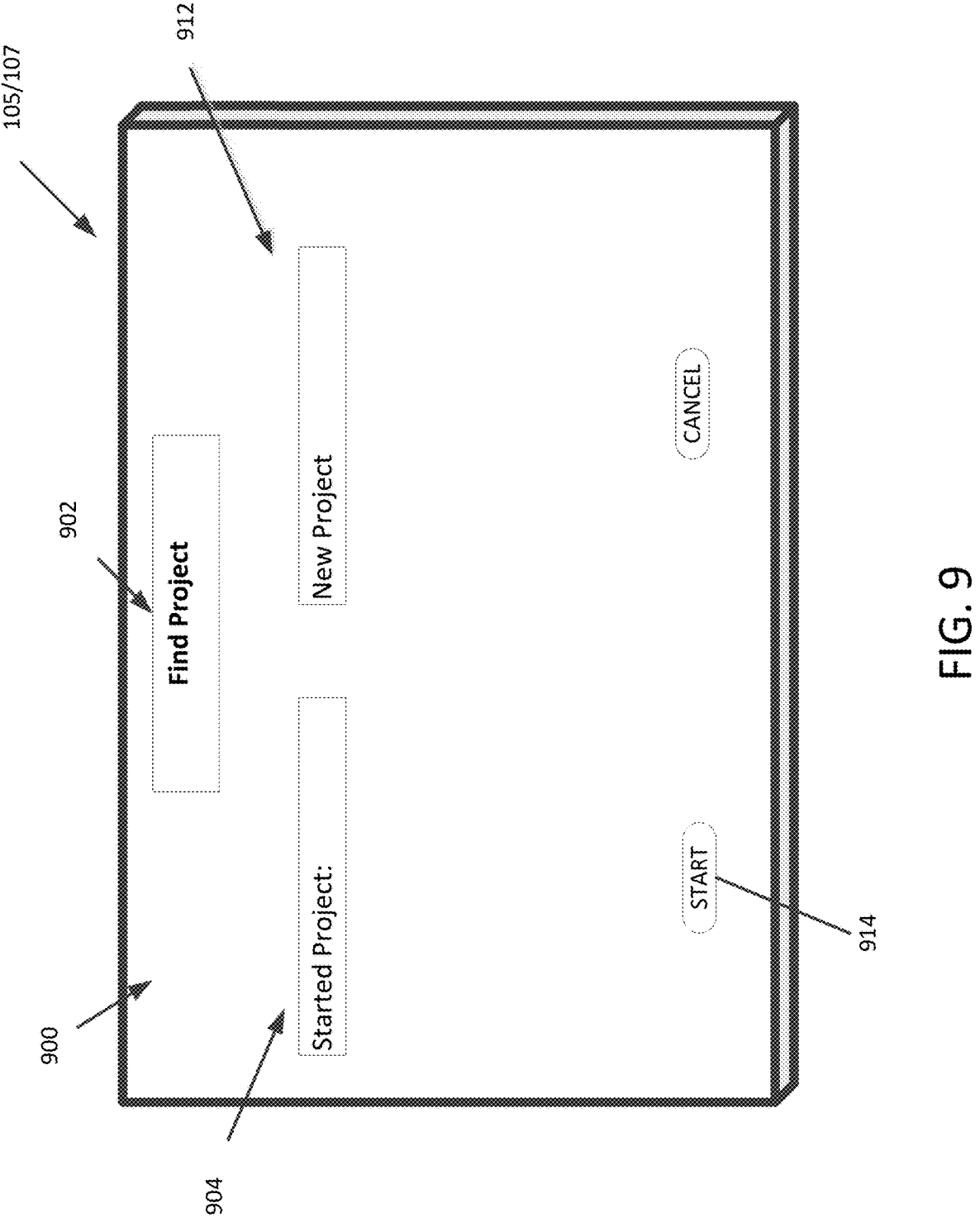
FIG. 9 illustrates a display screen for project search in accordance with exemplary aspects of the disclosure.

FIG. 9 illustrates a user interface screen for searching for a project to bid on. The find project form 902 is displayed in a search screen 900. A bidder can search for projects that have been started 904, or for new projects 912. The search may be started via a start button 914.

Figure 10:
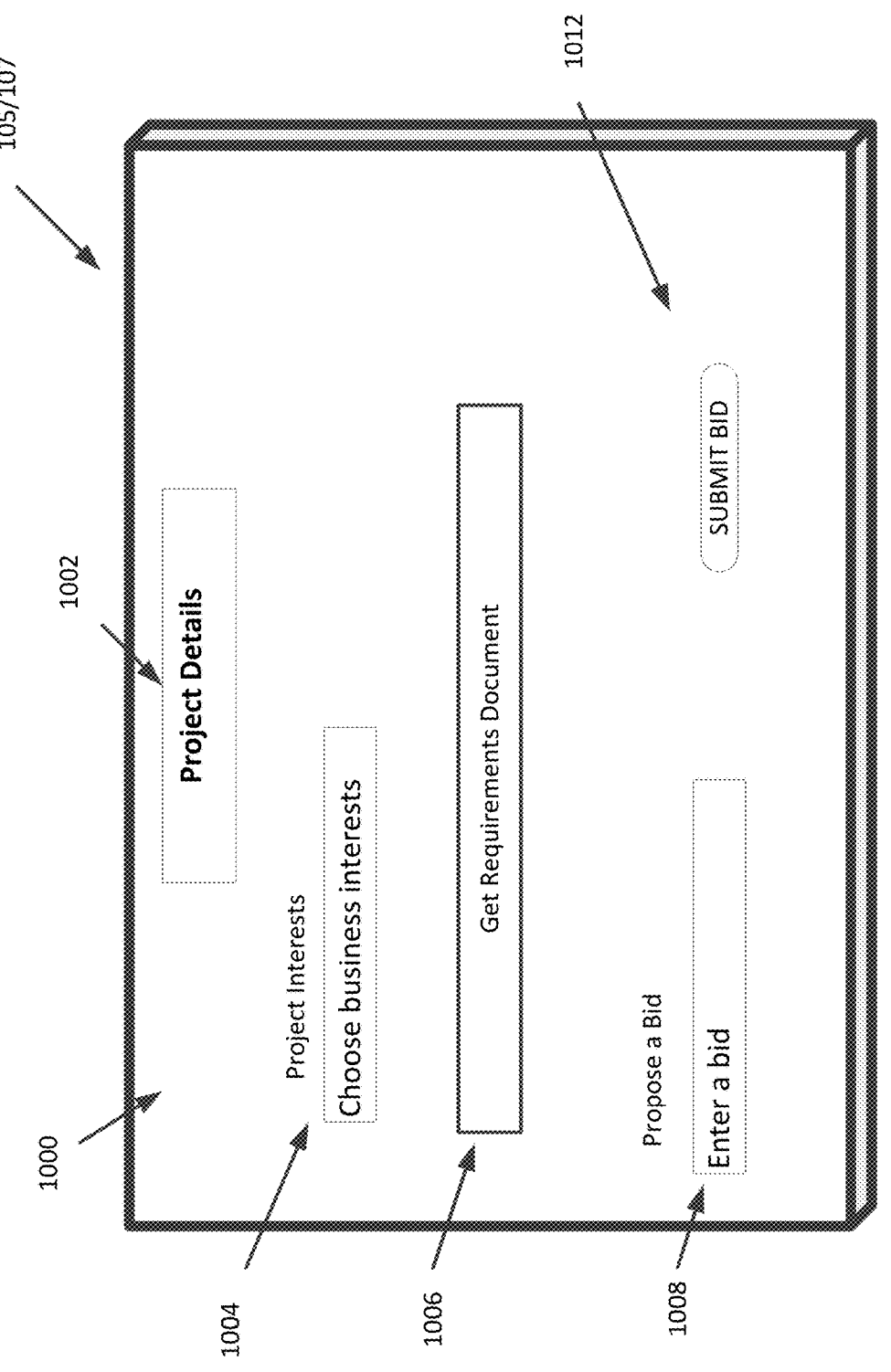
FIG. 10 illustrates a display screen for bidding on a project in accordance with exemplary aspects of the disclosure.

FIG. 10 illustrates a user interface screen 1000 for entering a bid for a project 1002. In an embodiment, a requirements document may be determined based on a business interest. A business interest may be entered, or selected in slot 1004. Any bidder who has an account on the platform can participate in the bidding. In the display screen of FIG. 9, bidders can view all published projects, even if the bidding start date is not achieved yet. In order to participate in the bidding, a bidder first needs to purchase the requirement document. Slot 1006 may be used to enter or select a requirements document to purchase. After purchasing the requirement document and the bidding is started, the bidder can start submitting the bid (proposed cost) by entering a bid in slot 1008 and pressing the submit bid button 1012.

Regarding FIG. 6C, in S512, a bid information file is submitted successfully. The role of the blockchain and encryption begins when a bidder submits bids.

In S514, the system invokes an encryption function.

In step S518, public and in step S516 private keys can be generated for each bid that has been submitted. The public key will be used for a first encryption only so no need to save it. The private key can be downloaded on a bidder's device 105. All bidders need to keep their bid private key (S542) to use it at the moment of opening the bids. Moreover, the disclosed blockchain system provides two layers of encryption to achieve data privacy. The first encryption C1 (S544) happens using the bid public key when the bidder submits the bid. Then the submitted bid will be combined with the submitting time and hashed using SHA-512 (S544) and stored into the system database. The first hash H1 is also sent to the blockchain with the submitting time to retrieve them later when verifying each bid. FIG. 4 shows the smart contract functions used to connect with the blockchain network and uses the "addBid" function from smart contract to push blocks to the blockchain.

Figure 5D:
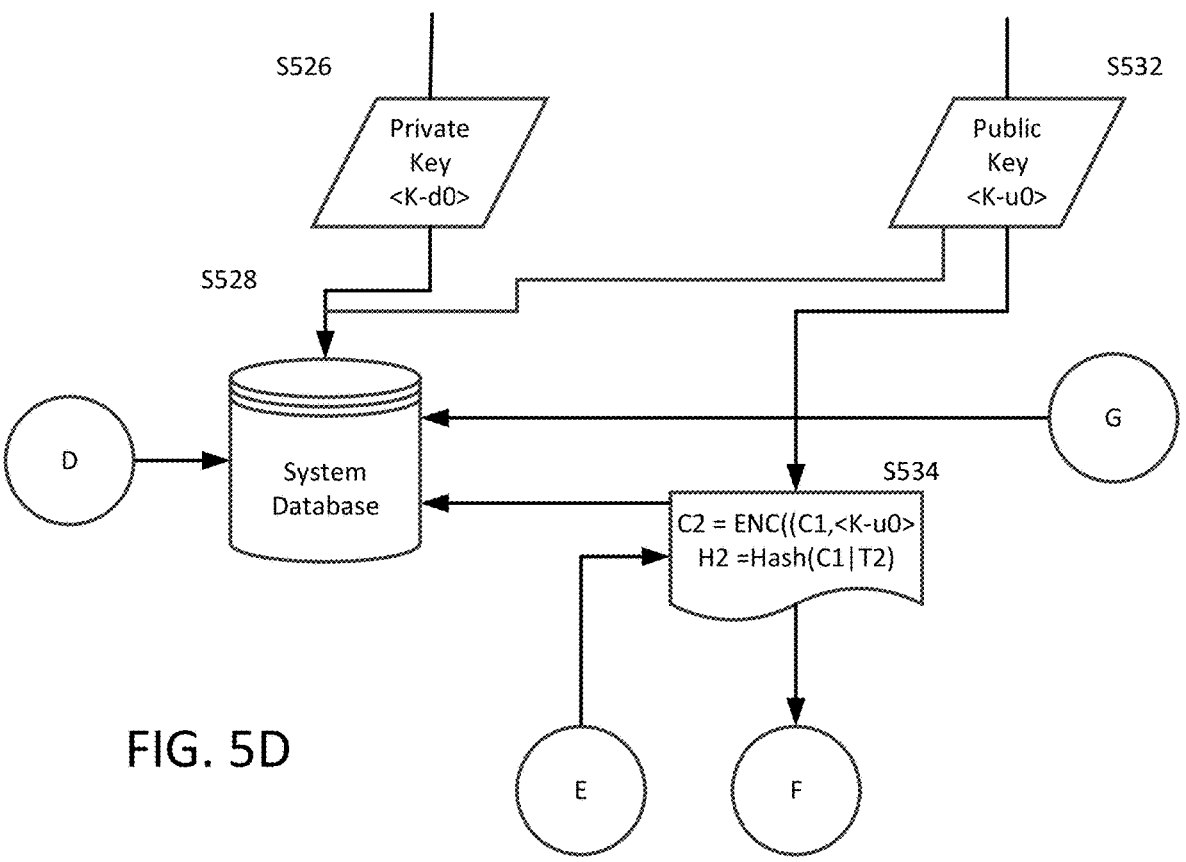

In FIG. 5D, a second encryption can occur when receiving the bid at the auctioneer side. In FIG. 5D, in S534, the encryption function is used to encrypt the encrypted bid information file C1 using the project public key to obtain a second encrypted bid information file C2. The second encrypted bid information file C2 is stored in the system database S528. In addition, the blockchain computer system generates a hash H2 on the encrypted bid information file C1. In particular, C1 is combined with receiving time and hashed using SHA-512. The hashed value and receiving time are stored on the blockchain using the "addBid" function in the smart contract.

When the bidding reaches opening time, each submitted bid will be decrypted using the project private key to get C1 and push notifications to the bidders to open their bids using the bid private key.

Figure 5E:
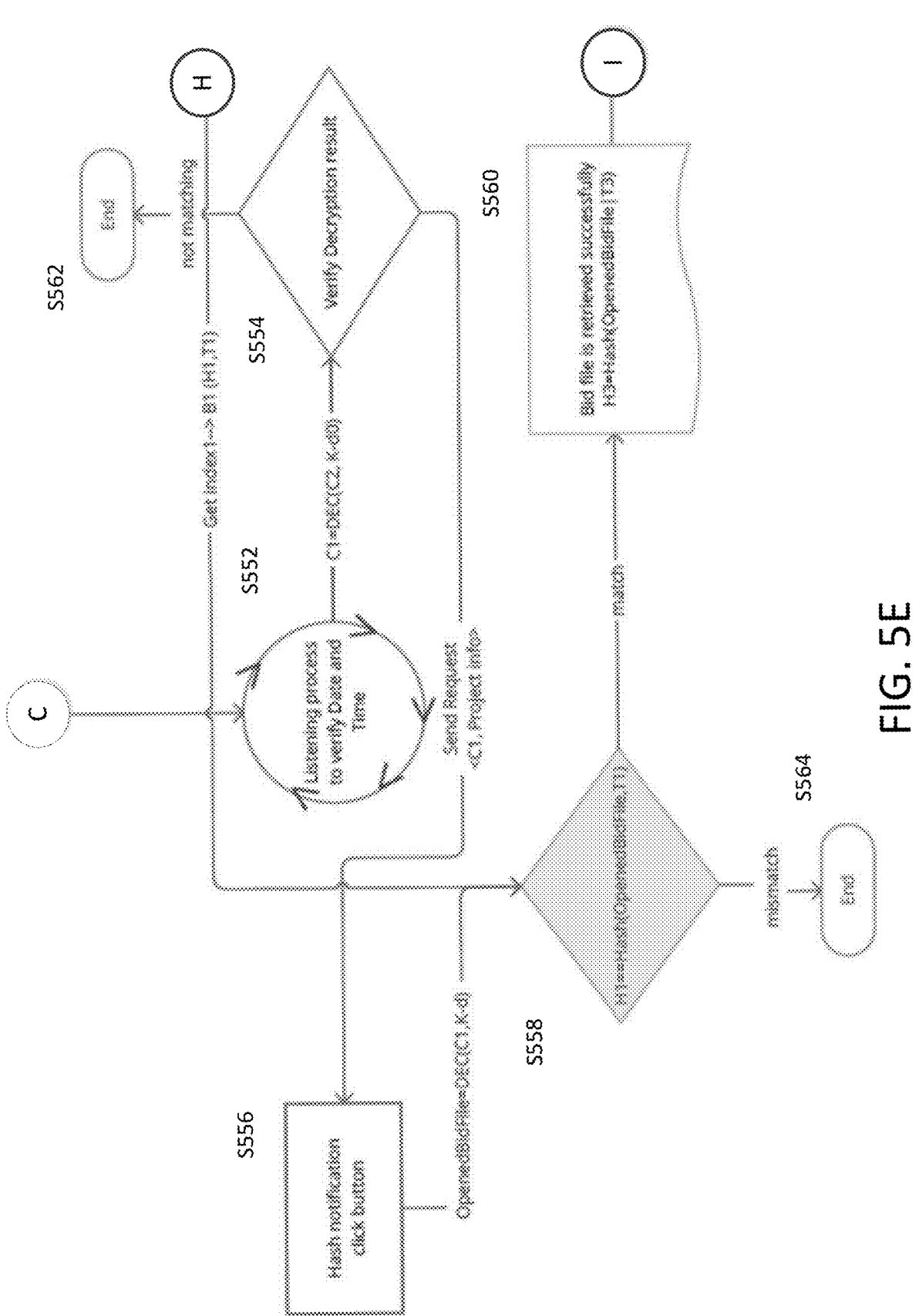

Referring to FIG. 5E, following step S522, in which the start and end dates are selected, in S552, the system continuously checks the date and time to determine if an expiration date/time has been reached.

Each bidder needs to login to his/her account and upload the private key. After decrypting the C1 a bidder should get the actual bid that has been submitted. Then the combined bid and the opening time are hashed and sent as the third block to the blockchain using the "addBid" function.

To verify each bid, the hashing value of the decryption result is matched with hashing that has been stored on the blockchain. The "getBid" smart contract function is used to retrieve blocks from the blockchain.

Figure 5F:
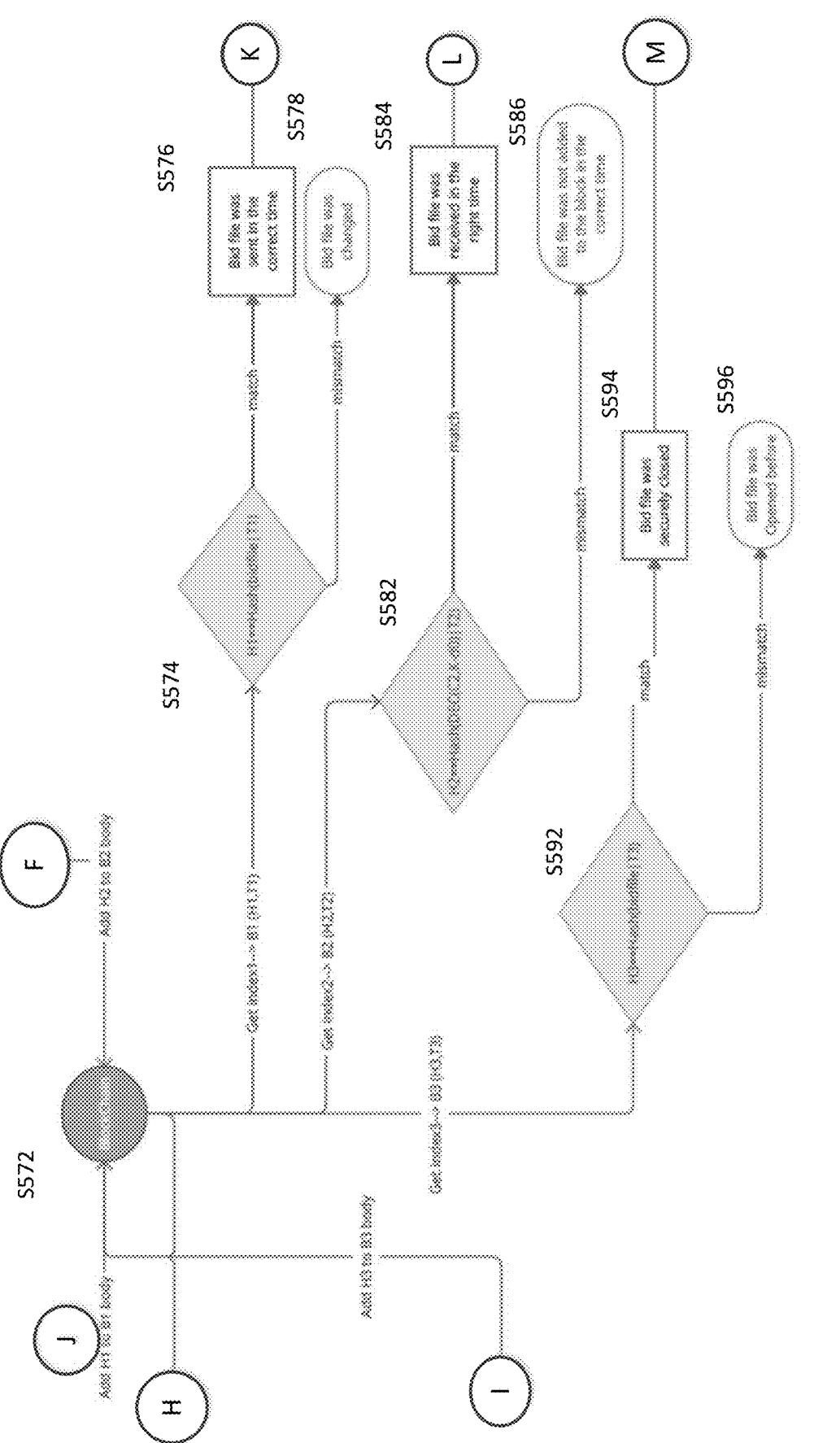
Figure 5G:
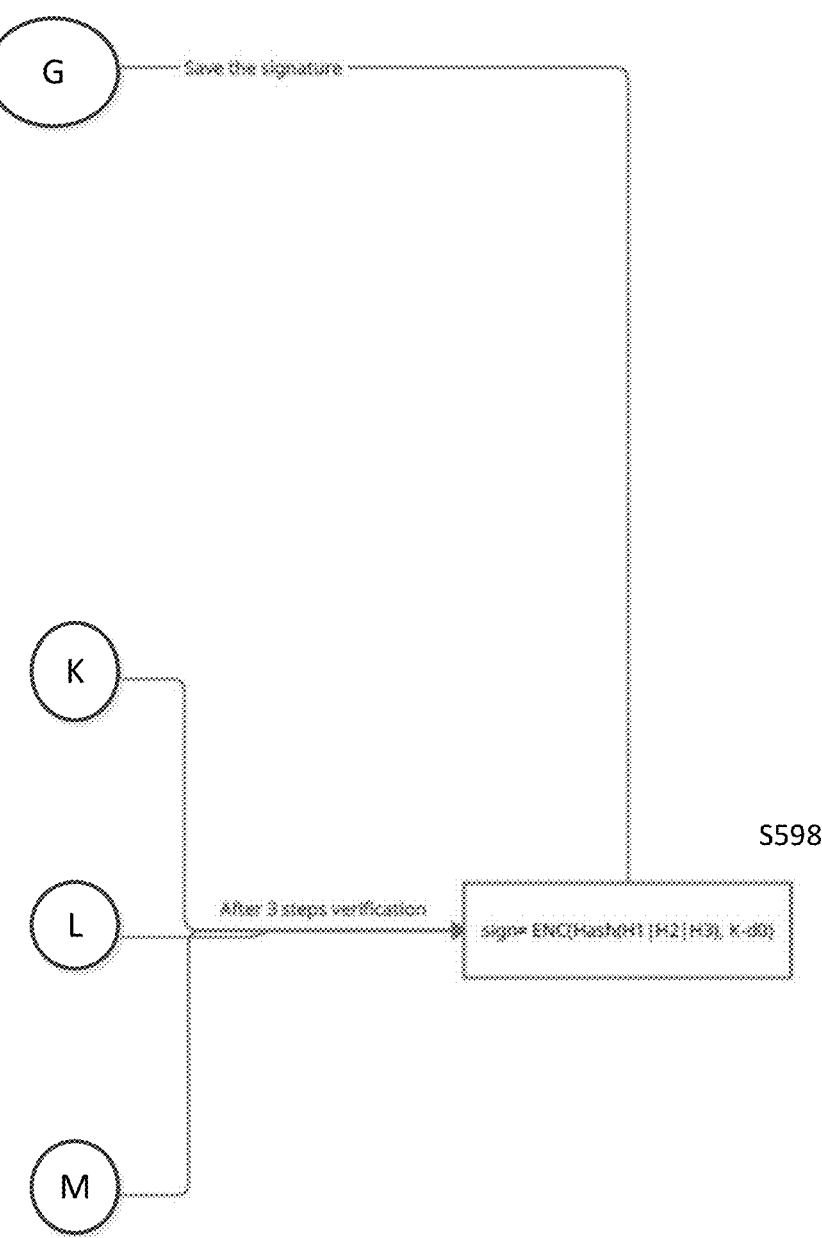

In FIG. 5F, the hash H1 is added to the blockchain S572, and the hash H2 is added to the blockchain S572. In addition, the hash H3 is added to the blockchain S572. As mentioned above, the process of adding a hash in a block to the blockchain is performed using a consensus algorithm to verify that the block can be added to the blockchain.

Referring back to FIG. 5E, a bid information file is received within the date and time limit of a project. The double encrypted bid file C2 is decrypted to obtain bid information file C1. In S554, the bid information file is verified by the system. The encrypted bid C1 and project information are sent to the contract manager. In S556, a hash notification click button is displayed in the user interface of the bidder, indicating that a bid information file has been received.

When the bid information file is not verified (No in S554), the bid information file is discarded.

Upon clicking the hash notification click button, the bid information file is decrypted and opened. In S558, the blockchain computer system checks that a hash of the opened bid information file matches the hash H1. If the hash is a match, the bid information file is retrieved successfully, in S560, a hash H3 of the opened bid information file is generated. In the case that the hash of the opened bid information file does not match (No S558), in S564, the bid information file will be discarded.

If the verification goes correctly, then a new hash value will be generated to prove this bid opened correctly without any modifications and send hashing value to the blockchain with the opening time. In particular, referring back to FIG. 5F, in S574, a hash is determined using the bid information file and compared to hash H1. If they match, in S576, the bid information file was sent within the time limit. Otherwise (mismatch in S574), the bid information file is determined to have changed in S578.

In S582, a hash is determined using the decrypted second encryption C2 and compared to hash H2. If they match, in S584, the bid information file was received within the time limit. Otherwise (mismatch in S582), the bid information file is determined to not have been added to the block in the time limit in S586.

In S592, a hash of the bid information file is compared to hash H3. If they match, in S594, the bid information file has been securely closed. Otherwise (mismatch in S592), the bid information file is determined to have been previously opened in S596.

The last block will include the actual value of the bid to retrieve it when choosing the winner. This block is added using the "addPrice" smart contract function.

Finally, a digital signature is generated to confirm that the bid went through the three stages correctly and the digital signature is stored in the system database. In S598, after the bid information file was sent within the time limit (S576), the bid information file was received within the time limit (S584), and the bid information file was securely closed (S594), in S598, the Hash H1, Hash H2, Hash H3 is encrypted and signed. The signature is saved in the system database S528.

Bid information files are handled in the above-described manner for each bidder, up until the set date/time in the project. The contract manager will select a bid for a bidder from among the successful bids. In an embodiment, after one day of opening the bids, the blockchain system will retrieve all bids from blockchain using "getPrice" smart contract function and compare them based on the lowest cost, choose the winner, and announce that on the platform.

Numerous modifications and variations of the present invention are possible in light of the above teachings. It is therefore to be understood that within the scope of the appended claims, the invention may be practiced otherwise than as specifically described herein.

The invention claimed is:

1. A computer-implemented method for enhancing data confidentiality in a blockchain, comprising:

maintaining the blockchain via a blockchain computer system, the blockchain computer system including a plurality of blockchain network nodes, the plurality of blockchain network nodes being connected to form a blockchain network, the blockchain being stored as copies of a distributed ledger on the blockchain network, the plurality of blockchain network nodes performing consensus-based verification to add a new block into the blockchain;

coupling a first computer to the blockchain as a first client device, wherein the first client device is configured to create a transaction specification, the transaction specification including an access condition for a protected transaction;

coupling a plurality of second computers to the blockchain as a plurality of second client devices, wherein each one of the plurality of second client devices is configured to submit a sensitive transaction file to participate in the protected transaction;

deploying a smart contract in the blockchain, the smart contract including a plurality of smart contract functions configured to protect the sensitive transaction files from being inappropriately modified or viewed;

upon the sensitive transaction file being submitted by at least one of the plurality of second computers, via the at least one of the plurality of second computers, executing a first encryption on the submitted sensitive transaction file to generate a first encrypted sensitive transaction file C1, calculating a first hash value H1 for the sensitive transaction file and a submitting time of the sensitive transaction file, and calling a smart contract function of the smart contract to add the first hash value H1 as a block B1 into the blockchain;

upon the first encrypted sensitive transaction file C1 being received by the first computer, via the blockchain computer system, performing a second encryption on the first encrypted sensitive transaction file C1 to generate a second encrypted sensitive transaction file C2, calculating a second hash value H2 for the first encrypted sensitive transaction file C1 and a receiving time of the first encrypted sensitive transaction file C1, and calling the smart contract function to add the second hash value H2 as a block B2 into the blockchain;

upon the access condition for the protected transaction being met, via the blockchain computer system, performing a decryption on the second encrypted sensitive transaction file C2 to obtain a decrypted sensitive transaction file, verifying the decryption by comparing the decrypted sensitive transaction file against the first encrypted sensitive transaction file C1, and upon determining that the decrypted sensitive transaction file matches with the first encrypted sensitive transaction file C1, sending to the at least one second computer a request for opening the decrypted sensitive transaction file;

upon receiving the request, via the at least one second computer, performing a decryption on the decrypted sensitive transaction file to generate an opened sensitive transaction file, comparing a new hash value calculated for the opened sensitive transaction file and the submitting time against the first hash value H1 in the block B1, and upon determining that the new hash value matches with the first hash value H1, calculating a third hash value H3 for the opened sensitive transaction file and the opening time, and calling the smart contract function to add the third hash value H3 as a block B3 into the blockchain;

via the blockchain computer system, performing a three-step verification for the sensitive transaction file, including:

a first verification based on the first hash value H1 in the block B1, to verify whether the sensitive transaction file was submitted at a correct time, a second verification based on the second hash value H2 in the block B2, to verify whether the sensitive transaction file was received at a correct time, and a third verification based on the third hash value H3 in the block B3, to verify whether the sensitive transaction file was opened at a correct time;

when any of the first, second, and third verifications obtains a negative result, marking the sensitive transaction file as having been inappropriately modified or viewed, and when the first, second, and third verifications all obtain positive results, determining that the sensitive transaction file was not inappropriately modified or viewed, and generating a digital signature based on the first hash value H1, the second hash value H2, and the third hash value H3; and upon the digital signature being generated for the sensitive transaction file, via the blockchain computer system, calling the smart contract function to add the sensitive transaction file as a block B4 into the blockchain.

2. The method of claim 1, wherein the blockchain computer system further comprises a database, wherein when the at least one of the second computers creates the sensitive transaction file, the at least one second computer generates a second private key and a second public key, encrypts, during the first encryption, the sensitive transaction file using the second public key to generate the first encrypted sensitive transaction file C1, and transmits the first encrypted sensitive transaction file C1 to the blockchain computer system, and wherein the blockchain computer system is configured to encrypt, during the second encryption, the first encrypted sensitive transaction file C1 using a first public key to generate the second encrypted sensitive transaction file C2, and store the second encrypted sensitive transaction file C2 in the database.

3. The method of claim 2, wherein the first computer is configured to generate a first private key and the first public key, wherein the protected transaction is associated with an access condition that includes a deadline, such that when the deadline expires, it is determined that the access condition for the protected transaction is met, and wherein the blockchain computer system decrypts the second encrypted sensitive transaction file C2 using the first private key to obtain the decrypted sensitive transaction file, and the at least one second computer decrypts the decrypted sensitive transaction file using the second private key to obtain the opened sensitive transaction file.

4. The method of claim 3, wherein the digital signature is generated by:

calculating a fourth hash value for the first hash value H1, the second hash value H2, and the third hash value H3, and encrypting the fourth hash value using the first private key, and wherein the digital signature is saved in the database for the sensitive transaction file to show that this opened sensitive transaction file is valid to be used in the protected transaction.

5. The method of claim 1, wherein the blockchain computer system performs a consensus algorithm to add each of the blocks B1, B2, B3, and B4 into the blockchain.

6. The method of claim 5, wherein the consensus algorithm is proof of work.

7. The method of claim 5, wherein the consensus algorithm is proof of stake.

8. The method of claim 1, wherein the first encryption is performed using a different encryption function than the second encryption.

9. The method of claim 1, wherein the first encryption is performed using RSA encryption, whereas the second encryption is performed using elliptic curve encryption.

10. A non-transitory computer-readable storage medium storing program instructions when executed by a computer system, the program instructions causing the computer system to perform a method for enhancing data confidentiality in a blockchain, the method comprising:

maintaining the blockchain via a blockchain computer system, the blockchain computer system including a plurality of blockchain network nodes, the plurality of blockchain network nodes being connected to form a blockchain network, the blockchain being stored as copies of a distributed ledger on the blockchain network, the plurality of blockchain network nodes performing consensus-based verification to add a new block into the blockchain;

coupling a first computer being to the blockchain as a first client device, wherein the first client device is configured to create a transaction specification, the transaction specification including an access condition for a protected transaction;

coupling a plurality of second computers to the blockchain as a plurality of second client devices, wherein each one of the plurality of second client devices is configured to submit a sensitive transaction file to participate in the protected transaction;

deploying a smart contract in the blockchain, the smart contract including a plurality of smart contract functions configured to protect the sensitive transaction files from being inappropriately modified or viewed;

upon the sensitive transaction file being submitted by at least one of the plurality of second computers, via the at least one of the plurality of second computers, executing a first encryption on the submitted sensitive transaction file to generate a first encrypted sensitive transaction file C1, calculating a first hash value H1 for the sensitive transaction file and a submitting time of the sensitive transaction file, and calling a smart contract function of the smart contract to add the first hash value H1 as a block B1 into the blockchain;

upon the first encrypted sensitive transaction file C1 being received by the first computer, via the blockchain computer system, performing a second encryption on the first encrypted sensitive transaction file C1 to generate a second encrypted sensitive transaction file C2, calculating a second hash value H2 for the first encrypted sensitive transaction file C1 and a receiving time of the first encrypted sensitive transaction file C1, and calling the smart contract function to add the second hash value H2 as a block B2 into the blockchain;

upon the access condition for the protected transaction being met, via the blockchain computer system, performing a decryption on the second encrypted sensitive transaction file C2 to obtain a decrypted sensitive transaction file, verifying the decryption by comparing the decrypted sensitive transaction file against the first encrypted sensitive transaction file C1, and upon determining that the decrypted sensitive transaction file matches with the first encrypted sensitive transaction file C1, sending to the at least one second computer a request for opening the decrypted sensitive transaction file;

upon receiving the request, via the at least one second computer, performing a decryption on the decrypted sensitive transaction file to generate an opened sensitive transaction file, comparing a new hash value calculated for the opened sensitive transaction file and the submitting time against the first hash value H1 in the block B1, and upon determining that the new hash value matches with the first hash value H1, calculating a third hash value H3 for the opened sensitive transaction file and the opening time, and calling the smart contract function to add the third hash value H3 as a block B3 into the blockchain;

via the blockchain computer system, performing a three-step verification for the sensitive transaction file, including:

a first verification based on the first hash value H1 in the block B1, to verify whether the sensitive transaction file was submitted at a correct time, a second verification based on the second hash value H2 in the block B2, to verify whether the sensitive transaction file was received at a correct time, and a third verification based on the third hash value H3 in the block B3, to verify whether the sensitive transaction file was opened at a correct time;

when any of the first, second, and third verifications obtains a negative result, marking the sensitive transaction file as having been inappropriately modified or viewed, and when the first, second, and third verifications all obtain positive results, determining that the sensitive transaction file was not inappropriately modified or viewed, and generating a digital signature based on the first hash value H1, the second hash value H2, and the third hash value H3; and upon the digital signature being generated for the sensitive transaction file, via the blockchain computer system, calling the smart contract function to add the sensitive transaction file as a block B4 into the blockchain.

11. The computer-readable storage medium of claim 10, wherein the blockchain computer system further comprises a database, wherein when the at least one of the second computers creates the sensitive transaction file, the at least one second computer generates a second private key and a second public key, encrypts, during the first encryption, the sensitive transaction file using the second public key to generate the first encrypted sensitive transaction file C1, and transmits the first encrypted sensitive transaction file C1 to the blockchain computer system, and wherein the blockchain computer system is configured to encrypt, during the second encryption, the first encrypted sensitive transaction file C1 using a first public key to generate the second encrypted sensitive transaction file C2, and store the second encrypted sensitive transaction file C2 in the database.

12. The computer-readable storage medium of claim 11, wherein the first computer is configured to generate a first private key and the first public key, wherein the protected transaction is associated with an access condition that includes a deadline, such that when the deadline expires, it is determined that the access condition for the protected transaction is met, and wherein the blockchain computer system decrypts the second encrypted sensitive transaction file C2 using the first private key to obtain the decrypted sensitive transaction file, and the at least one second computer decrypts the decrypted sensitive transaction file using the second private key to obtain the opened sensitive transaction file.

13. The computer-readable storage medium of claim 12, wherein the digital signature is generated by:

calculating a fourth hash value for the first hash value H1, the second hash value H2, and the third hash value H3, and encrypting the fourth hash value using the first private key, and wherein the digital signature is saved in the database for the sensitive transaction file to show that this opened sensitive transaction file is valid to be used in the protected transaction.

14. The computer-readable storage medium of claim 10, wherein the blockchain computer system performs a consensus algorithm to add each of the blocks B1, B2, B3, and B4 into the blockchain.

15. The computer-readable storage medium of claim 14, wherein the consensus algorithm is proof of work.

16. The computer-readable storage medium of claim 14, wherein the consensus algorithm is proof of stake.

17. The computer-readable storage medium of claim 10, wherein the first encryption is performed using a different encryption function than the second encryption.

18. The computer-readable storage medium of claim 10, wherein the first encryption is performed using RSA encryption, and the second encryption is performed using elliptic curve encryption.

* * * * *